(12) United States Patent
Niranjan et al.

(10) Patent No.: US 8,959,195 B1
(45) Date of Patent: Feb. 17, 2015

(54) CLOUD SERVICE LEVEL ATTESTATION

(71) Applicant: EMC Coporation, Hopkinton, MA (US)

(72) Inventors: Thirumale N. Niranjan, Bangalore (IN); Karthikeyan Srinivasan, Bangalore (IN); Sairam Veeraswamy, South Grafton, MA (US)

(73) Assignee: EMC Corporation, Hopkinton, MA (US)

( * ) Notice: Subject to any disclaimer, the term of this patent is extended or adjusted under 35 U.S.C. 154(b) by 163 days.

(21) Appl. No.: 13/628,757

(22) Filed: Sep. 27, 2012

(51) Int. Cl.
*G06F 15/173* (2006.01)
*H04L 12/24* (2006.01)

(52) U.S. Cl.
CPC ........................... *H04L 41/50* (2013.01)
USPC .......................................... 709/223; 709/229

(58) Field of Classification Search
CPC .................................. G06F 21/50; G06F 9/20
USPC ..................... 709/201, 223, 224, 226, 229
See application file for complete search history.

(56) References Cited

U.S. PATENT DOCUMENTS

| | | | |
|---|---|---|---|
| 7,437,449 B1 * | 10/2008 | Monga et al. ................. | 709/224 |
| 8,626,891 B2 | 1/2014 | Guru et al. | |
| 2006/0178898 A1 * | 8/2006 | Habibi ............................... | 705/1 |
| 2011/0270968 A1 | 11/2011 | Salsburg et al. | |
| 2011/0276686 A1 * | 11/2011 | Tung et al. .................... | 709/224 |
| 2011/0289329 A1 | 11/2011 | Bose et al. | |
| 2012/0060165 A1 | 3/2012 | Clarke | |
| 2012/0110156 A1 | 5/2012 | Guru et al. | |
| 2012/0179824 A1 * | 7/2012 | Jackson ........................ | 709/226 |
| 2013/0066940 A1 | 3/2013 | Shao | |
| 2013/0111032 A1 | 5/2013 | Alapati et al. | |

OTHER PUBLICATIONS

P. Mell et al., "The NIST Definition of Cloud Computing," U.S. Department of Commerce, Computer Security Division, National Institute of Standards and Technology, Special Publication 800-145, Sep. 2011, 7 pages.

* cited by examiner

*Primary Examiner* — Ebrahim Golabbakhsh
(74) *Attorney, Agent, or Firm* — Ryan, Mason & Lewis, LLP (57) ABSTRACT

Techniques are disclosed for measuring and attesting to service levels offered by a service provider in a computing system implemented with a distributed virtual infrastructure. In one example, a method comprises the following steps. Information is maintained relating to one or more services offered by one or more service providers in accordance with a distributed virtual infrastructure. One or more service level claims associated with the one or more services are validated. A subscriber is sent validation results for at least a portion of the one or more services.

18 Claims, 5 Drawing Sheets

CLOUD SERVICE LEVEL ATTESTATION

FIELD

The field relates to computing systems implemented with a distributed virtual infrastructure, and more particularly to techniques for measuring and attesting to service levels offered by a service provider in a computing system implemented with a distributed virtual infrastructure.

BACKGROUND

As is known today, more and more companies that rely on computing technology are adopting the approach of owning nearly no physical computing assets themselves, but rather have turned to the information technology (IT) computing model known as "cloud computing." For example, as per the National Institute of Standards and Technology (NIST Special Publication No. 800-145), cloud computing is a model for enabling ubiquitous, convenient, on-demand network access to a shared pool of configurable computing resources (e.g., networks, servers, storage, applications, and services) that can be rapidly provisioned and released with minimal management effort or service provider interaction.

In this environment, many cloud services have been proposed including, but not limited to, Computing-as-a-Service (CaaS), Software-as-a-Service (SasS), Platform-as-a-Service (PaaS), and Infrastructure-as-a-Service (IaaS). As such IT offerings become more standardized and commoditized, the cloud trend is only going to accelerate such that IT administrators (individuals or groups that manage, or at least assist with, IT assets and issues for an entity such as an enterprise or business) will have many choices of cloud service providers (SP) that offer the same cloud service. Choosing the correct SP will be a challenge for the IT administrator.

SUMMARY

Embodiments of the invention provide techniques for measuring and attesting to service levels offered by a service provider in a computing system implemented with a distributed virtual infrastructure.

In one embodiment, a method comprises the following steps. Information is maintained relating to one or more services offered by one or more service providers in accordance with a distributed virtual infrastructure. One or more service level claims associated with the one or more services are validated. A subscriber is sent validation results for at least a portion of the one or more services. In one example, the information maintaining step may further comprise providing a database for storing the information relating to the one or more services offered by the one or more service providers in accordance with the distributed virtual infrastructure.

In another embodiment, a computer program product is provided which comprises a processor-readable storage medium having encoded therein executable code of one or more software programs. The one or more software programs when executed by at least one processing device implement steps of the above-described method.

In yet another embodiment, an apparatus comprises a memory and a processor operatively coupled to the memory and configured to perform steps of the above-described method.

In a further embodiment, a system comprises the following components. A cloud service broker database is configured to maintain information relating to one or more cloud services offered by one or more cloud service providers. A cloud service broker processor is operatively coupled to the cloud service broker database and configured to validate one or more service level claims associated with the one or more cloud services, and send to the subscriber validation results for at least a portion of the one or more cloud services.

Advantageously, illustrative embodiments described herein provide techniques that assist IT administrators in selecting a cloud service offering from a service provider from among multiple service providers each offering a similar cloud service. This is accomplished using a cloud service broker that validates service level claims made by the service provider in order to provide the IT administrator with a level of assurance that the cloud service that is ultimately selected will serve its purpose and operate at an acceptable service level.

These and other features and advantages of the present invention will become more readily apparent from the accompanying drawings and the following detailed description.

DETAILED DESCRIPTION

Embodiments of the invention will be described herein with reference to exemplary computing systems and data storage systems and associated servers, computers, storage units and devices and other processing devices. It is to be appreciated, however, that embodiments of the invention are not restricted to use with the particular illustrative system and device configurations shown. Moreover, the phrases "computing system" and "data storage system" as used herein are intended to be broadly construed, so as to encompass, for example, private or public cloud computing or storage systems, as well as other types of systems comprising distributed virtual infrastructure. However, a given embodiment may more generally comprise any arrangement of one or more processing devices.

More particularly, embodiments of the invention provide a cloud service broker (CSB) system that aids IT administrators in selecting a service provider for a particular cloud service. The CSB system measures (i.e, monitors) and attests to (i.e, validates) the service level agreements (SLAs) offered by a service provider. This monitoring and validation service that the CSB system itself offers to IT administrators or other subscribers is referred to as a "Cloud Service Level Attestation as a Service (CSLAaaS)".

Figure 1:
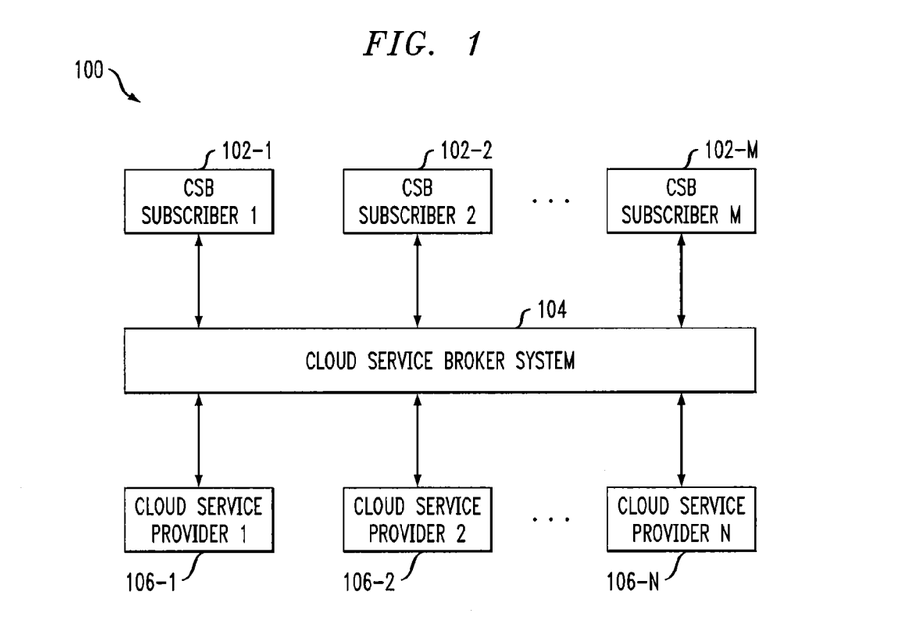
FIG. 1 shows a cloud service broker system environment, in accordance with one embodiment of the invention.

FIG. 1 shows a cloud service broker system environment 100, in accordance with one embodiment of the invention. As shown, cloud service broker (CSB) subscribers 102-1, 102-2, . . . , 102-M are operatively coupled to CSB system 104. Subscribers are, for example, IT administrators associated with some entity interested in utilizing one or more cloud services. This entity may be a corporation or some other enterprise that chooses to utilize cloud computing resources for its computing and/or storage needs rather than procuring and owning physical computing and storage assets itself.

Also shown in FIG. 1, CSB system 104 is operatively coupled to cloud service providers 106-1, 106-2, ..., 106-N. Cloud service providers are the provider entities that host or otherwise provide the cloud services that a particular corporation or other enterprise desires.

As will be described in detail herein below, CSB system 104 offers to subscribers 102-1, 102-2, ..., 102-M the above-mentioned CSLAaaS. This service includes, but is not limited to, the following functions. CSB system 104 performs, for its subscribers, experimental validation and attestation of service level claims of one or more of the cloud service providers 106-1, 106-2, ..., 106-N. Also, CSB system 104 continuously monitors the service levels over some duration, i.e., a given time period. Such time period can be specified by a subscriber. Further details of the CSB system 104 will be provided below.

Figure 2A:
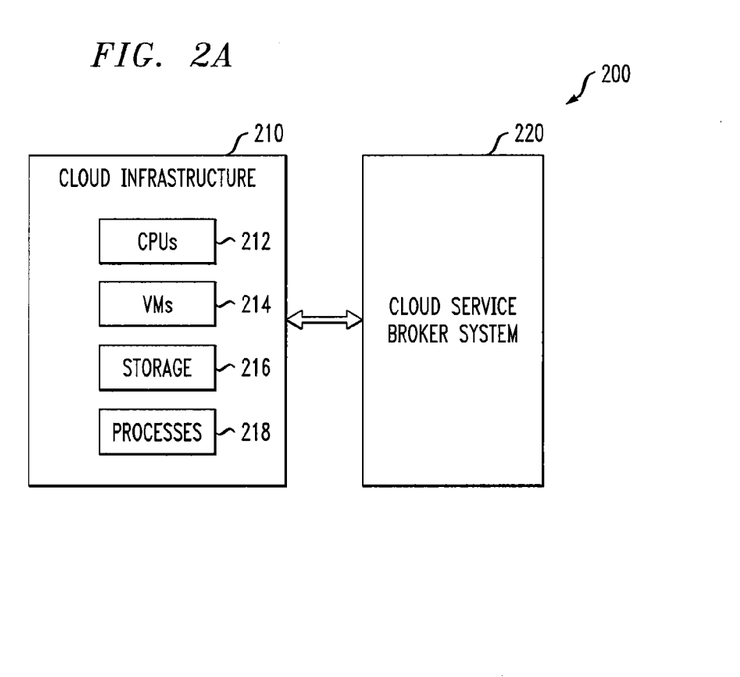
FIG. 2A shows cloud infrastructure and a cloud service broker system, in accordance with one embodiment of the invention.

FIG. 2A shows a system 200 configured in accordance with an illustrative embodiment of the present invention. As shown, the system 200 comprises cloud infrastructure 210 and cloud service broker (CSB) system 220. As mentioned above and as will be explained in detail below, CSB system 220 enables a subscriber to obtain assurances that service level claims made by a particular service provider are accurate. Cloud infrastructure 210 is illustratively depicted in the figure as comprising an execution environment with execution components comprising one or more central processing units (CPUs) 212, one or more virtual machines (VMs) 214, and storage devices 216 (upon which logical units (LUs) are implemented) that execute one or more processes 218 that operate on one or more process input data sets that generate one or more process output data sets. It is to be appreciated that the one or more cloud services that CSB system 220 monitors and validates are implemented in the cloud infrastructure 210. When such components shown in cloud infrastructure 210 are distributed (e.g., functionally and/or geographically), the infrastructure is considered to be a distributed virtual infrastructure.

It is to be appreciated that part of or all of system 200 can be implemented in the cloud service broker system environment 100 in FIG. 1. For instance, CSB system 220 can be implemented in CSB system 104 of FIG. 1. However, parts of CSB system 220 can be implemented in subscribers 102-1, 102-2, ..., 102-M and/or cloud service providers 106-1, 106-2, ..., 106-N of FIG. 1. Still further, CSB system 220 can be implemented in part or in whole in one or more other computing devices or systems (not shown) in the cloud service broker system environment of FIG. 1.

Although system elements 210 and 220 are shown as separate elements in FIG. 2A, these elements or portions thereof may be implemented at least in part on a common processing platform. In other embodiments, one or more of the system elements 210 and 220 may each be implemented on a separate processing platform, such as the processing platform to be described below in conjunction with FIG. 3. For example, the cloud infrastructure 210 may be implemented on a first processing device of a first processing platform and CSB system 220 may be implemented on a second processing device of a second processing platform. It is also to be understood that a given embodiment of the system 200 may include multiple instances of the system elements 210 and 220, although only single instances of such elements are shown in the system diagram for clarity and simplicity of illustration.

Figure 2B:
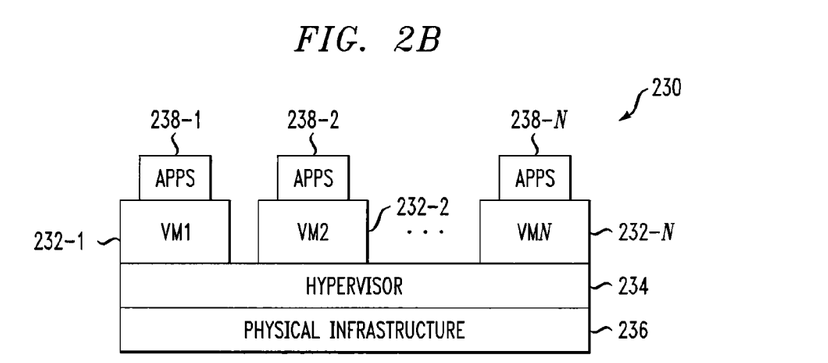
FIG. 2B shows a more detailed view of the cloud infrastructure of FIG. 2A.

As shown in FIG. 2B, the cloud infrastructure 230 (corresponding to 210 in FIG. 2A) comprises virtual machines (VMs) 232-1, 232-2, ..., 232-N implemented using a hypervisor 234. The hypervisor 234 is an example of what is more generally referred to herein as "virtualization infrastructure." The hypervisor 234 runs on physical infrastructure 236 (e.g., such as may include CPUs 212 and/or storage devices 216 in FIG. 2A). The cloud infrastructure 230 further comprises sets of applications 238-1, 238-2, ..., 238-N running on respective ones of the virtual machines 232-1, 232-2, ..., 232-N (utilizing associated LUs) under the control of the hypervisor 234.

Although only a single hypervisor 234 is shown in the example of FIG. 2B, a given embodiment of cloud infrastructure configured in accordance with an embodiment of the invention may include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs in a manner similar to that of a physical machine. Thus, different virtual machines can run different operating systems and multiple applications on the same physical computer. Virtualization is implemented by the hypervisor 234 which, as shown in FIG. 2B, is directly inserted on top of the computer hardware in order to allocate hardware resources of the physical computer (physical infrastructure 236) dynamically and transparently. The hypervisor 234 affords the ability for multiple operating systems to run concurrently on a single physical computer and share hardware resources with each other.

An example of a commercially available hypervisor platform that may be used to implement portions of the cloud infrastructure 230 (210) in one or more embodiments of the invention is the VMware® vSphere™ which may have an associated virtual infrastructure management system such as the VMware® vCenter™. The underlying physical infrastructure 236 may comprise one or more distributed processing platforms that include storage products such as VNX and Symmetrix VMAX, both commercially available from EMC Corporation of Hopkinton, Mass. A variety of other storage products may be utilized to implement at least a portion of the cloud infrastructure 230 (210).

Figure 3:
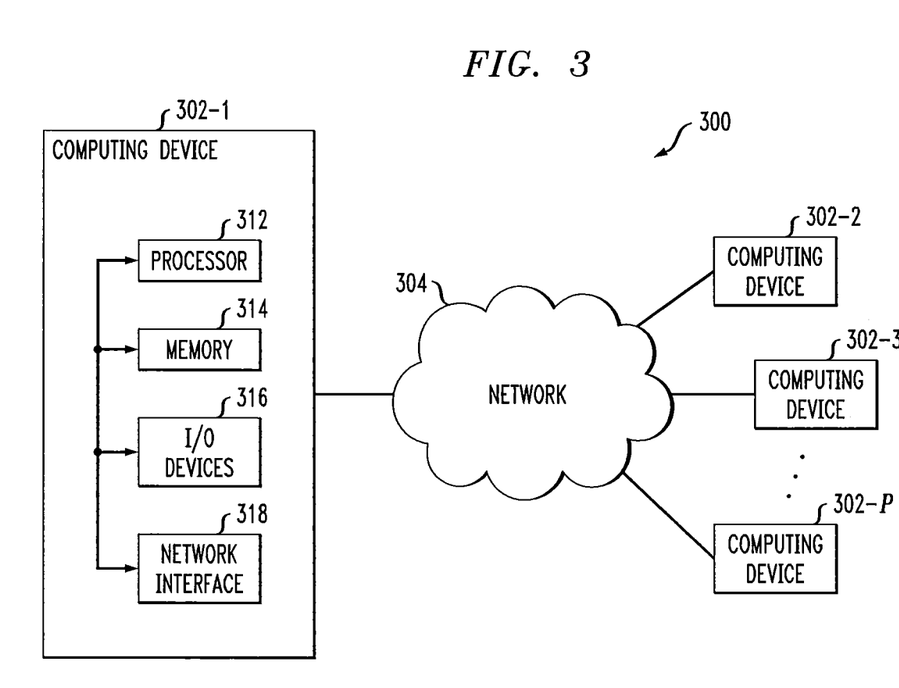
FIG. 3 shows a processing platform on which the cloud infrastructure and the cloud service broker system of FIG. 2A are implemented, in accordance with one embodiment of the invention.

An example of a processing platform on which the cloud infrastructure 210 and/or CSB system 220 of FIG. 2A (as well as the components of environment 100 in FIG. 1) may be implemented is processing platform 300 shown in FIG. 3. The processing platform 300 in this embodiment comprises at least a portion of the system 200 (and/or environment 100) and includes a plurality of computing devices, denoted 302-1, 302-2, 302-3, ..., 302-P, which communicate with one another over a network 304. One or more of the elements of system 200 (100) may therefore each run on a server, computer or other processing platform element, which may be viewed as an example of what is more generally referred to herein as a "computing device" (or a processing device). As illustrated in FIG. 3, such a device generally comprises at least one processor and an associated memory, and implements one or more functional modules for controlling certain features of system 200 (100). Again, multiple elements or modules may be implemented by a single processing device in a given embodiment. In one example, a subscriber 102 of FIG. 1 can utilize one or more computing devices 302 of FIG. 3, CSB system 104 of FIG. 1 can utilize one or more computing devices 302 of FIG. 3, and a cloud service provider 106 of FIG. 1 can utilize one or more computing devices 302 of FIG. 3.

The computing device 302-1 in the processing platform 300 comprises a processor 312, a memory 314, input/output devices 316, and a network interface 318. The processor 312 may comprise a microprocessor, a microcontroller, an application-specific integrated circuit (ASIC), a field programmable gate array (FPGA) or other type of processing circuitry, as well as portions or combinations of such circuitry elements. The memory 314 may be viewed as an example of what is more generally referred to herein as a "computer program product." A computer program product comprises a processor-readable storage medium having encoded therein executable code of one or more software programs. Such a memory may comprise electronic memory such as, by way of example only, random access memory (RAM), read-only memory (ROM) or other types of memory, in any combination. The computer program code when executed by a processing device such as the computing device 302-1 causes the device to perform functions associated with one or more of the elements of system 200 (100). One skilled in the art would be readily able to implement such software given the teachings provided herein. Other examples of computer program products embodying embodiments of the invention may include, for example, optical or magnetic disks.

The computing device 302-1 also includes input/output (I/O) devices 316, for example, one or more devices or mechanisms for inputting data to the processor 312 and/or memory 314 (for example, keyboard or mouse), and one or more devices or mechanisms for providing results associated with the processor 312 and/or memory 314 (for example, display or printer).

Also included in the computing device 302-1 is network interface circuitry 318, which is used to interface the computing device with the network 304 and other system components. Such circuitry may comprise conventional transceivers of a type well known in the art.

The other computing devices 302 of the processing platform 300 are assumed to be configured in a manner similar to that shown for computing device 302-1 in the figure.

The processing platform 300 shown in FIG. 3 may comprise additional known components such as but not limited to batch processing systems, parallel processing systems, physical machines, virtual machines, virtual network switches, storage volumes, logical units, etc. Again, the particular processing platform shown in the figure is presented by way of example only, and system 300 may include additional or alternative processing platforms, as well as numerous distinct processing platforms in any combination.

Also, numerous other arrangements of servers, computers, storage devices, computing devices or other components are possible in system 300. Such components can communicate with other elements of the system 300 over any type of network, such as a wide area network (WAN), a local area network (LAN), a satellite network, a telephone or cable network, or various portions or combinations of these and other types of networks.

Illustrative details of CSB system 220 (CSB system 104) will now be described with reference to FIGS. 4 and 5.

Figure 4:
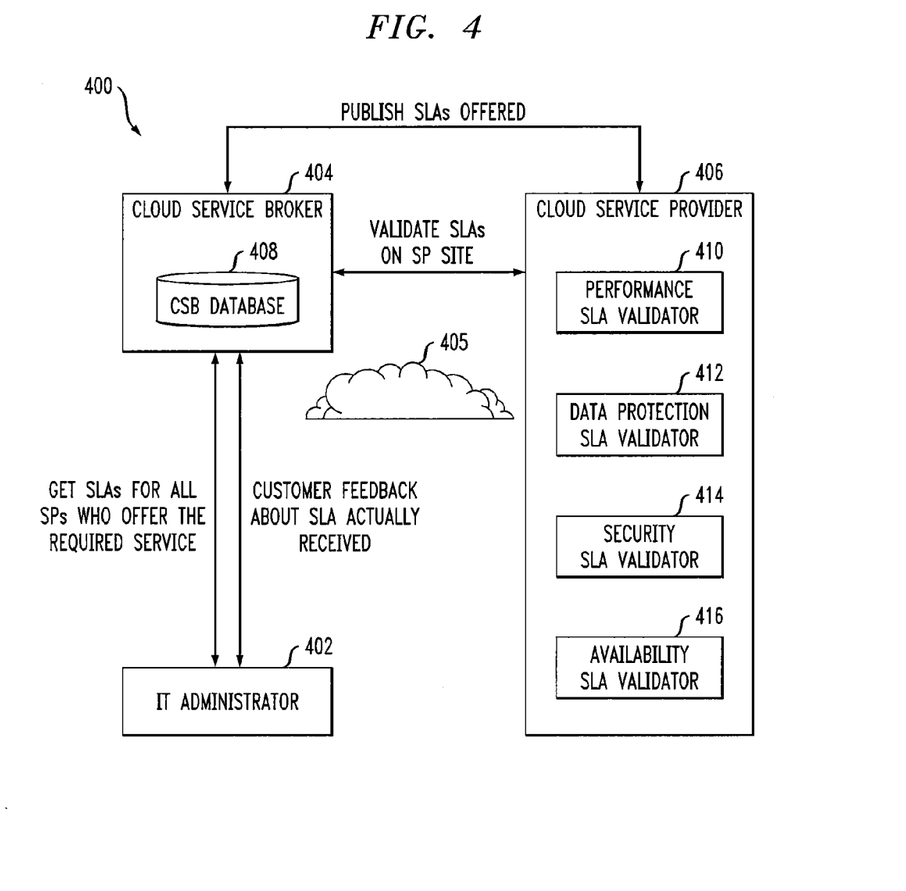
FIG. 4 shows a cloud service broker system, in accordance with one embodiment of the invention.

FIG. 4 shows a cloud service broker system 400, in accordance with one embodiment of the invention. As shown, an IT administrator (cloud subscriber) 402 is operatively coupled to a cloud service broker 404, which is operatively coupled to a cloud service provider 406. Network 405 represents a communication network (e.g., Internet, intranet, wireless, wired, or some combination thereof) over which the components in FIG. 4 communicate.

The cloud service broker 404 maintains a CSB database 408 with the following content stored therein (in the following fields associated with the example schema):

[SP, list of [Offering, Platform, SLA, Price]]

where SP is a unique service provider identifier;

where SLA=list of [Performance SLAs such as latency and throughput for various workload types; Data Protection SLAs such as RPO (Recovery Point Objective) and RTO (Recovery Time Objective); Availability SLAs such as "Five 9's" (classic availability standard); Security SLAs such as Complete Tenant Isolation];

where Offering=the type of service being offered by SP (e.g., Amazon's EC2, S3 or EBS (Elastic Block Store));

where Platform=the type of virtual computing platform being offered to host the service (e.g., Vmware or Xen); and where Price is the cost associated with the service.

With regard to SLA performance, it is to be understood that the CSB database 408 may take into account performance measures beyond just storage performance. This may include compute and network resource performance as well. Thus, for example, CSB database 408 can also take into account measures such as MIPS (millions of instructions per second), the number of transactions (OLTP—online transaction processing), security level, and tenancy attributes.

As shown in FIG. 4, embodiments of the invention provide several mechanisms to keep the CSB database 408 populated and maintained with up-to-date data. By way of example only:

(1) The cloud service provider 406 offers (e.g., publish) input data to the database via an API (application programming interface—not expressly shown in FIG. 4 but assumed to be part of CSB 404) to the CSB 404. This data would constitute an initial seed, which would then be independently verified by the CSB 404.

(2) Feedback from the subscribers (IT administrator 402) themselves via an API/portal (not expressly shown in FIG. 4 but assumed to be part of CSB 404) to the CSB 404.

(3) The CSB 404 performs independent measurement and verification. While the first two mechanisms are understood in a straightforward manner, we explain the third one in more detail. The CSB 404 conducts targeted experiments. The CSB 404 continually uses the cloud service provider 406 as would an actual user and measures the database inputs that it is able to measure, e.g., adherence to performance SLAs and data protection SLAs can be measured. Also, a method can be used to determine that tenant isolation (if offered) is honored. Outage information can be measured directly because the CSB 404 is constantly using the service provider's entire ensemble of features, and can verify claims of availability SLAs.

Some SLAs can be validated without needing cooperation from the cloud service provider 406. Examples of such validation mechanisms are as follows:

(1) For a Storage-as-a-Service such as S3, performance SLAs such as Object put/get times can be measured remotely.

(2) For application level performance offered by a combination of services (such as EC2+EBS), CSB 404 can instantiate VMs, run common applications and validate the performance SLAs (such as Transactions/second in a TPC-H like environment, where TPC-H (Transaction Processing Performance Council) is an ad hoc, decision support benchmark.

(3) Data protection SLAs can be measured by creating replicas, triggering DRs (disaster recovery plans), etc.

However, there may be SLAs that have to be measured with the cooperation of the cloud service provider 406 (such as reliability SLAs) and possible participation of the end-customer (in case the application is unique). For these cases, embodiments of the invention provide plug-in/agent mechanisms (e.g., software applets) called "SLA validator agents," where service provider 406 allows CSB 404 to trigger specific actions to create scenarios to measure SLAs. The agents are designed so as not to interfere with the other customers' data and applications. As shown in the embodiment of FIG. 4, CSB 404 maintains validator agents on the cloud service provider 406. These validators include, but are not limited to, performance SLA validator 410, data protection SLA validator 412, security SLA validator 414 and availability SLA validator 416. The validators are placed at the service provider 406 by the CSB 404, e.g., by the CSB downloading them to the service provider so that they are instantiated on the service provider.

Figure 5:
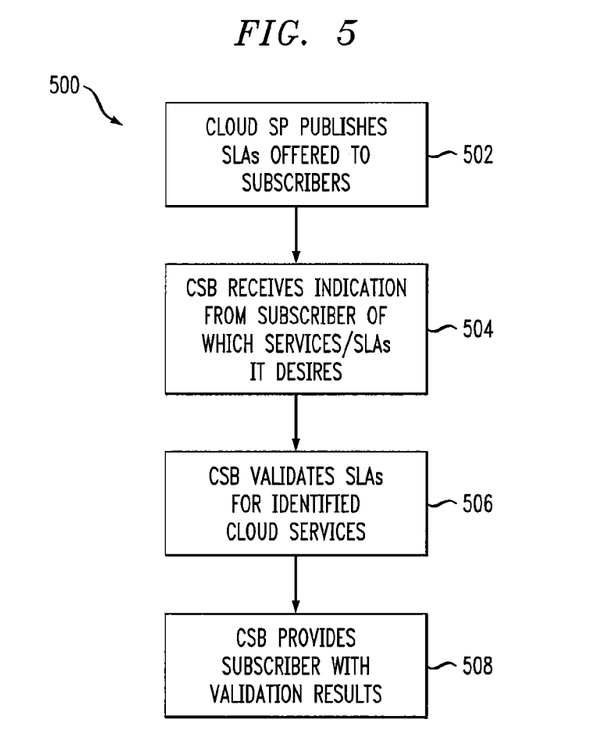
FIG. 5 shows a cloud service broker methodology, in accordance with one embodiment of the invention.

FIG. 5 shows a cloud service broker methodology 500, in accordance with one embodiment of the invention. In step 502, a cloud service provider (406) publishes SLAs being offered to subscribers. This information is stored by the CSB (404 in database 408). The CSB, in step 504, receives an indication from a subscriber (402) of which services/SLAs it desires to have validated. The subscriber can also provide the CSB with feedback about SLAs actually received. This information is also stored in the CSB. In step 506, the CSB validates the SLAs for the service or services identified by the subscriber, for example, in a manner described above. The CSB, in step 508, provides the subscriber with validation results such that the subscriber can make a decision about a cloud service. It is to be appreciated that while FIG. 5 shows steps 502 through 508 in a particular order, embodiments of the invention contemplate the steps being in different orders.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
maintaining information relating to one or more services offered by one or more service providers in accordance with a distributed virtual infrastructure;
validating, at a service broker, using one or more validator agents placed at the one or more service providers, one or more service level claims associated with the one or more services, wherein the service broker measures and verifies the one or more service level claims by using at least a part of the one or more services in a manner in which a subscriber would use the one or more services; and
sending to the subscriber validation results for at least a portion of the one or more services;
wherein the maintaining, validating and sending steps are performed by at least one processing device.

2. The method of claim 1, wherein the information maintaining step further comprises providing a database for storing the information relating to the one or more services offered by the one or more service providers in accordance with the distributed virtual infrastructure.

3. The method of claim 1, wherein the information maintaining step further comprises receiving and storing feedback information from the subscriber relating to actual use of at least one of the one or more services.

4. The method of claim 1, wherein the information maintaining step further comprises receiving and storing input data from at least one of the one or more service providers relating to at least one of the one or more services.

5. The method of claim 1, wherein the information maintaining step further comprises receiving and storing information obtained through the validation step.

6. The method of claim 1, wherein the service level claims associated with the one or more services are in the form of one or more service level agreements.

7. The method of claim 6, wherein the one or more service level agreements comprise service level agreements relating to at least one of performance, data protection, security and availability associated with the one or more services.

8. The method of claim 1, wherein the subscriber is an information technology administrator.

9. The method of claim 1, wherein the distributed virtual infrastructure is a cloud infrastructure and the one or more services are one or more cloud services.

10. The method of claim 1, wherein the information maintaining step further comprises storing the information in a schema for each of the one or more services comprising a service identifier field, an offering field, a platform field, a service level agreement field and a price field.

11. The method of claim 1, wherein the step of providing the subscriber with validation results for at least a portion of the one or more services is part of a Cloud Service Level Attestation as a Service (CSLAaaS) offered to the subscriber.

12. A computer program product comprising a non-transitory processor-readable storage medium having encoded therein executable code of one or more software programs, wherein the one or more software programs when executed by the at least one processing device implement the steps of the method of claim 1.

13. An apparatus comprising:
at least one memory; and
at least one processor operatively coupled to the at least one memory and forming a service broker, the service broker configured to: maintain information relating to one or more services offered by one or more service providers in accordance with a distributed virtual infrastructure; validate one or more service level claims associated with the one or more services by using one or more validator agents placed at the one or more service providers, wherein the service broker measures and verifies the one or more service level claims by using at least a part of the one or more services in a manner in which a subscriber would use the one or more services; and send to the subscriber validation results for at least a portion of the one or more services.

14. The apparatus of claim 13, wherein the information maintaining further comprises providing a database in the memory for storing the information relating to the one or more services offered by the one or more service providers in accordance with the distributed virtual infrastructure.

15. The apparatus of claim 13, wherein the information maintaining further comprises receiving and storing in the memory feedback information from the subscriber relating to actual use of at least one of the one or more services.

16. The apparatus of claim 13, wherein the information maintaining further comprises receiving and storing input data in the memory from at least one of the one or more service providers relating to at least one of the one or more services.

17. The apparatus of claim 13, wherein the information maintaining further comprises receiving and storing in the memory information obtained through the service level claim validation.

18. A system, comprising:
- a cloud service broker database maintaining information relating to one or more cloud services offered by one or more cloud service providers; and
- a cloud service broker processor operatively coupled to the cloud service broker database, and validating one or more service level claims associated with the one or more cloud services using one or more validator agents placed at the one or more cloud service providers, wherein the cloud service broker processor measures and verifies the one or more service level claims by using at least a part of the one or more cloud services in a manner in which a subscriber would use the one or more services and sending to the subscriber validation results for at least a portion of the one or more cloud services.

* * * * *